United States Patent
Bougaev et al.

(10) Patent No.: US 7,672,808 B2
(45) Date of Patent: Mar. 2, 2010

(54) DETERMINING A CENTER OF ROTATION FOR A COMPONENT IN A COMPUTER SYSTEM

(75) Inventors: Anton A. Bougaev, La Jolla, CA (US); David K. McElfresh, San Diego, CA (US); Kenny C. Gross, San Diego, CA (US); Aleksey M. Urmanov, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 12/109,551

(22) Filed: Apr. 25, 2008

(65) Prior Publication Data

US 2009/0271145 A1    Oct. 29, 2009

(51) Int. Cl.
*G01C 9/00* (2006.01)
*G01B 3/30* (2006.01)
(52) U.S. Cl. ................................ 702/150; 73/1.79
(58) Field of Classification Search .......... 702/158, 702/127, 141, 150–153, 155, 179–180, 33–36, 702/56–59, 81, 84, 85, 94, 95, 145, 182; 73/1.75, 1.79, 1.82, 570, 649, 660, 664, 1.01, 73/1.37, 488, 490, 496, 577; 714/1, 25, 47, 714/48; 700/1, 21, 63, 64, 108–110, 275, 700/280
See application file for complete search history.

(56) References Cited

U.S. PATENT DOCUMENTS

| 6,873,931 | B1 * | 3/2005 | Nower et al. ................. 702/151 |
| 6,961,202 | B2 * | 11/2005 | Ikedo et al. ............... 360/77.02 |
| 6,967,804 | B1 * | 11/2005 | Codilian ....................... 360/75 |
| 2007/0159710 | A1 * | 7/2007 | Lucas et al. ................... 360/75 |
| 2008/0255795 | A1 * | 10/2008 | Shkolnikov ................. 702/141 |

OTHER PUBLICATIONS

Oboe, R., MEMS-Based Accelerometers Use in Hard Disk Drives, 2002, Microsystem Technologies 8, pp. 174-181.*

* cited by examiner

*Primary Examiner*—Michael P. Nghiem
*Assistant Examiner*—Toan M Le
(74) *Attorney, Agent, or Firm*—Park, Vaughan & Fleming LLP

(57) ABSTRACT

Some embodiments of the present invention provide a system that determines a center of rotation for a component in a computer system. During operation, the system measures a first acceleration of a first location on the component and a second acceleration of a second location on the component, wherein the first location and the second location are separated by a predetermined distance. Then, the system determines the center of rotation using the first acceleration, the second acceleration, and the predetermined distance.

17 Claims, 3 Drawing Sheets

US 7,672,808 B2

DETERMINING A CENTER OF ROTATION FOR A COMPONENT IN A COMPUTER SYSTEM

BACKGROUND

1. Field

The present invention generally relates to techniques for improving the reliability of computer systems. More specifically, the present invention relates to a method and an apparatus for determining a center of rotation for a component in a computer system.

2. Related Art

Components in a computer system, such as the chassis, disk drives, disk drive cages, and printed circuit boards (PCBs), can suffer damage through vibrations which can potentially lead to failure of the component or computer system. Therefore, to ensure proper mechanical design of a computer system, it is important to understand the vibration modes of components in the computer system. This allows designers to mitigate the impact of these vibrations at the design stage through design changes, vibration damping, or isolation of components. In particular, in order to design a computer system to reduce potential damage due to the rotational vibration of computer system components, knowledge of the position of the center of rotation of the components is needed.

Hence, what is needed is a method and an apparatus for determining a center of rotation for a component in a computer system.

SUMMARY

Some embodiments of the present invention provide a system that determines a center of rotation for a component in a computer system. During operation, the system measures a first acceleration of a first location on the component and a second acceleration of a second location on the component, wherein the first location and the second location are separated by a predetermined distance. Then, the center of rotation is determined using the first acceleration, the second acceleration, and the predetermined distance.

Some embodiments additionally measure a third acceleration of a third location on the component and a fourth acceleration of a fourth location on the component, wherein the first location, the second location, the third location, and the fourth location are situated at predetermined locations for vertices of a tetrahedron. The center of rotation is then determined using the first acceleration, the second acceleration, the third acceleration, the fourth acceleration and the predetermined locations for the vertices of the tetrahedron.

In some embodiments, measuring the first acceleration includes generating a histogram of acceleration of the first location, and determining a value of the first acceleration based on the histogram.

In some embodiments, determining the center of rotation includes determining a distance between the component and the center of rotation.

In some embodiments, the component includes a hard disk drive.

In some embodiments, the component includes a mezzanine structure.

In some embodiments, determining the center of rotation includes determining if a chassis intrusion of the computer system has occurred.

In some embodiments, determining the center of rotation includes determining a state of degradation of the component in the computer system.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Figure 1A:
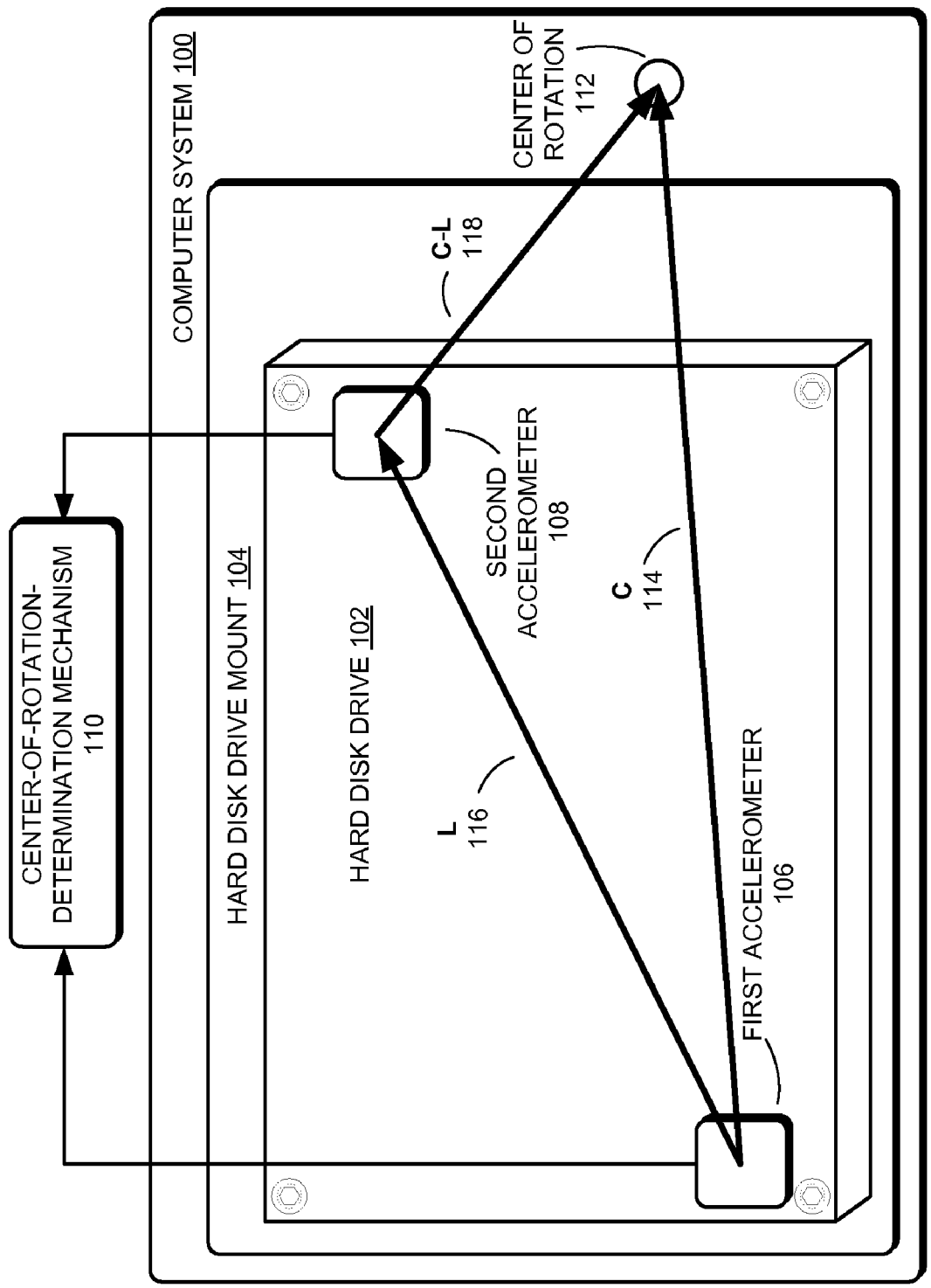
FIG. 1A illustrates a system for use in determining a center of rotation for a component in a computer system in accordance with some embodiments of the present invention.

FIG. 1A illustrates a system for use in determining a center of rotation for a component in a computer system in accordance with some embodiments of the present invention. Computer system 100 includes hard disk drive 102 mounted on hard disk drive mount 104, wherein first accelerometer 106 and second accelerometer 108 are attached to hard disk drive 102. Additionally, center-of-rotation-determination mechanism 110 is coupled to first accelerometer 106 and second accelerometer 108. It is noted that center of rotation 112 is the center of rotational motion that is desired to be determined. There are a number of vectors illustrated in FIG. 1A. More specifically, vector C 114 is a vector from the location of first accelerometer 106 to center of rotation 112, vector L 116 is a vector from the location of first accelerometer 106 to the location of second accelerometer 108, and vector C-L 118 is a vector from the location of second accelerometer 108 to center of rotation 112.

In the embodiments of FIG. 1A, it is assumed that the rotation measured by first accelerometer 106 and second accelerometer 108 occurs in the plane of the figure. In 2-dimensional embodiments, center of rotation 112 represents an axis of rotation perpendicular to the plane of rotation. The case of rotation in 3-dimensions will be discussed below. During rotational motion about center of rotation 112, first accelerometer 106 moves perpendicular to vector C 114 in the plane of rotation, and second accelerometer 108 moves perpendicular to vector C-L 118 in the plane of rotation. During this process, first accelerometer 106 sends a signal to center-of-rotation-determination mechanism 110 representing the acceleration of first accelerometer 106, and second accelerometer 108 sends a signal to center-of-rotation-determination mechanism 110 representing the acceleration of second accelerometer 108.

Embodiments of center-of-rotation-determination mechanism 110 determine the location of center of rotation 112 from the signals received from first accelerometer 106 and second accelerometer 108 using the process described below. Center-of-rotation-determination mechanism 110 includes any mechanism that can receive signals representing acceleration from first accelerometer 106 and second accelerometer 108 and determine center of rotation 112. Center-of-rotation-determination mechanism 110 can be implemented in any combination of hardware and software. In some embodiments, center-of-rotation-determination mechanism 110 operates on computer system 100. In other embodiments, center-of-rotation-determination mechanism 110 operates on one or more service processors. In still other embodiments, center-of-rotation-determination mechanism 110 is located inside of computer system 100. In yet other embodiments, center-of-rotation-determination mechanism 110 operates on a separate computer system. In general, center-of-rotation-determination mechanism 110 can include any computation device now known or later developed.

Figure 1B:
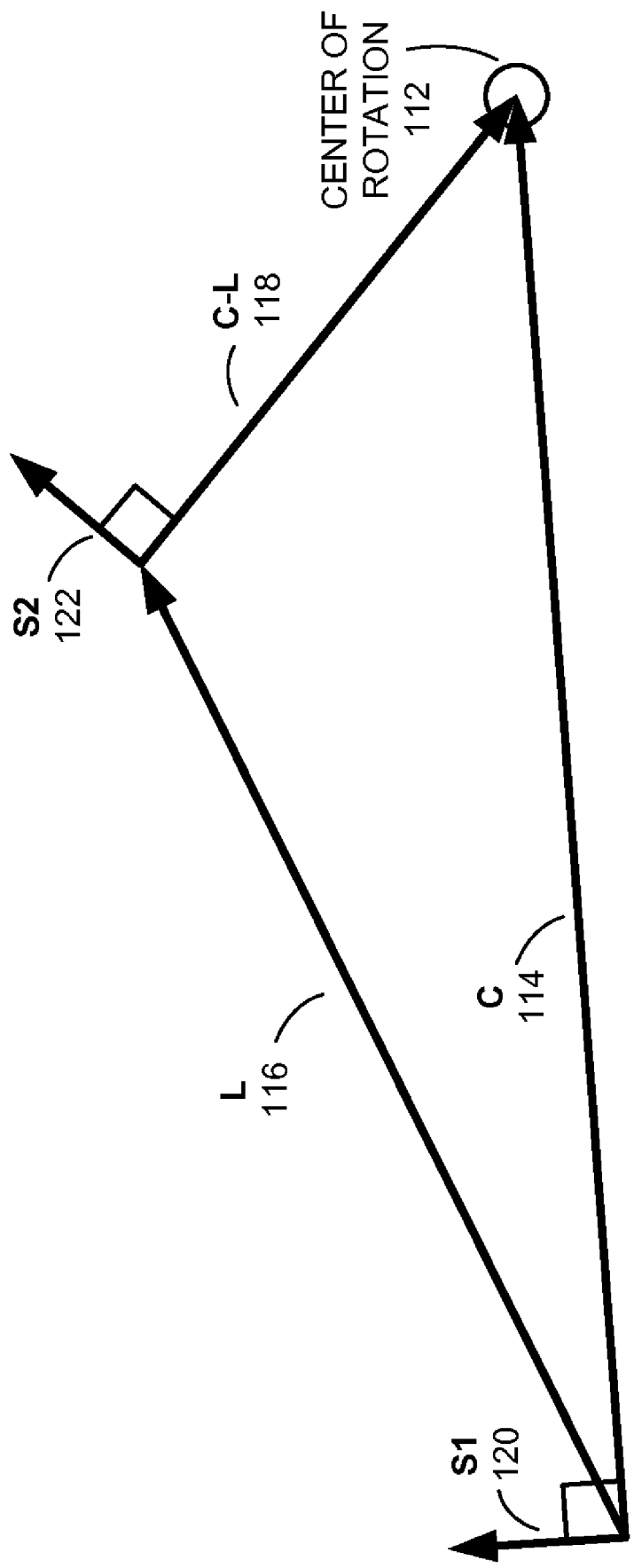
FIG. 1B illustrates a diagram depicting vectors associated with the embodiments of FIG. 1A.

FIG. 1B illustrates a diagram depicting vectors associated with the embodiments of FIG. 1A. In FIG. 1B, vector S1 120 represents the displacement of first accelerometer 106 during rotational motion in the plane of rotation about center of rotation 112, and is perpendicular to vector C 114, resulting in the vector dot product of vector S1 120 and vector C 114 being equal to zero. Vector S2 122 represents the displacement of second accelerometer 108 during rotational motion in the plane about center of rotation 112, and is perpendicular to vector C-L 118, resulting in the vector dot product of vector S2 122 and vector C-L 118 being equal to zero. These 2 conditions can be represented by the two vector equations below:

$$S1 \cdot C = 0 \quad (1)$$

$$S2 \cdot (C-L) = 0 \quad (2)$$

These two equations can be differentiated twice using the known rules of vector differentiation to obtain equations relating the unknown distance vector C 114 between first accelerometer 106 and center of rotation 112 to the acceleration from first accelerometer 106, the acceleration from second accelerometer 108, and the known distance vector L 116 between first accelerometer 106 and second accelerometer 108.

In the embodiments depicted in FIG. 1A, first accelerometer 106 and second accelerometer 108 can be 2-axis accelerometers, each oriented so that the plane formed by the 2 axes measured by each accelerometer is parallel to the plane of rotation.

It is noted that some embodiments of this technique can be generalized to rotation in 3-dimensions with the use of 4 3-axis accelerometers. In these embodiments, the 4 accelerometers are placed on the component on the vertices of a known tetrahedron so that the spatial relationship between the locations of the 4 accelerometers is known, and such that all four of the accelerometers are not in the same plane and no three accelerometers form a straight line. In these embodiments, when the component, and hence the accelerometers rotate in 3-dimensions about the center of rotation, the displacement of each accelerometer is perpendicular to a radial vector between the center of rotation and the accelerometer. Thus, a system of 4 equations can then be generated in which each equation sets the vector dot product of the rotational displacement of an accelerometer with the radius vector from the accelerometer to the center of rotation equal to 0. This system of equations can then be differentiated using the known rules of vector differentiation and then solved for the center of rotation using acceleration data from the 4 accelerometers and the known spatial relationship between the four accelerometers.

It is noted that the acceleration of a location on the component can be the acceleration of a location on the surface of the component or inside the component. In some embodiments, the component can include but is not limited to: a hard disk drive; a CD or DVD drive; a hard disk drive mounting bracket; a hard disk drive back plane; a mezzanine board; a chassis; a chassis cover; a motherboard; a processor; a processor mount; a memory board; any other board in a computer system; or a mock-up, model, or stand-in for any component. In some embodiments, during the design phase of a computer system, the center of rotation for the component when the component is situated at the designed location is determined, and the design can be modified to mitigate the effects of the rotation on the component. In other embodiments, the component location is designed to increase the distance between the component and the center of rotation.

In some embodiments, the center of rotation of a component is measured over time to determine if the center of rotation has moved with respect to the component. Motion of the center of rotation with respect to a component can be used to indicate conditions including but not limited to one or more of the following: degradation of the component or other parts of the computer system; intrusion into the chassis; faulty repair; authorized or unauthorized replacement of a component; and missing, loose, or incorrectly installed components or fasteners.

Figure 2:
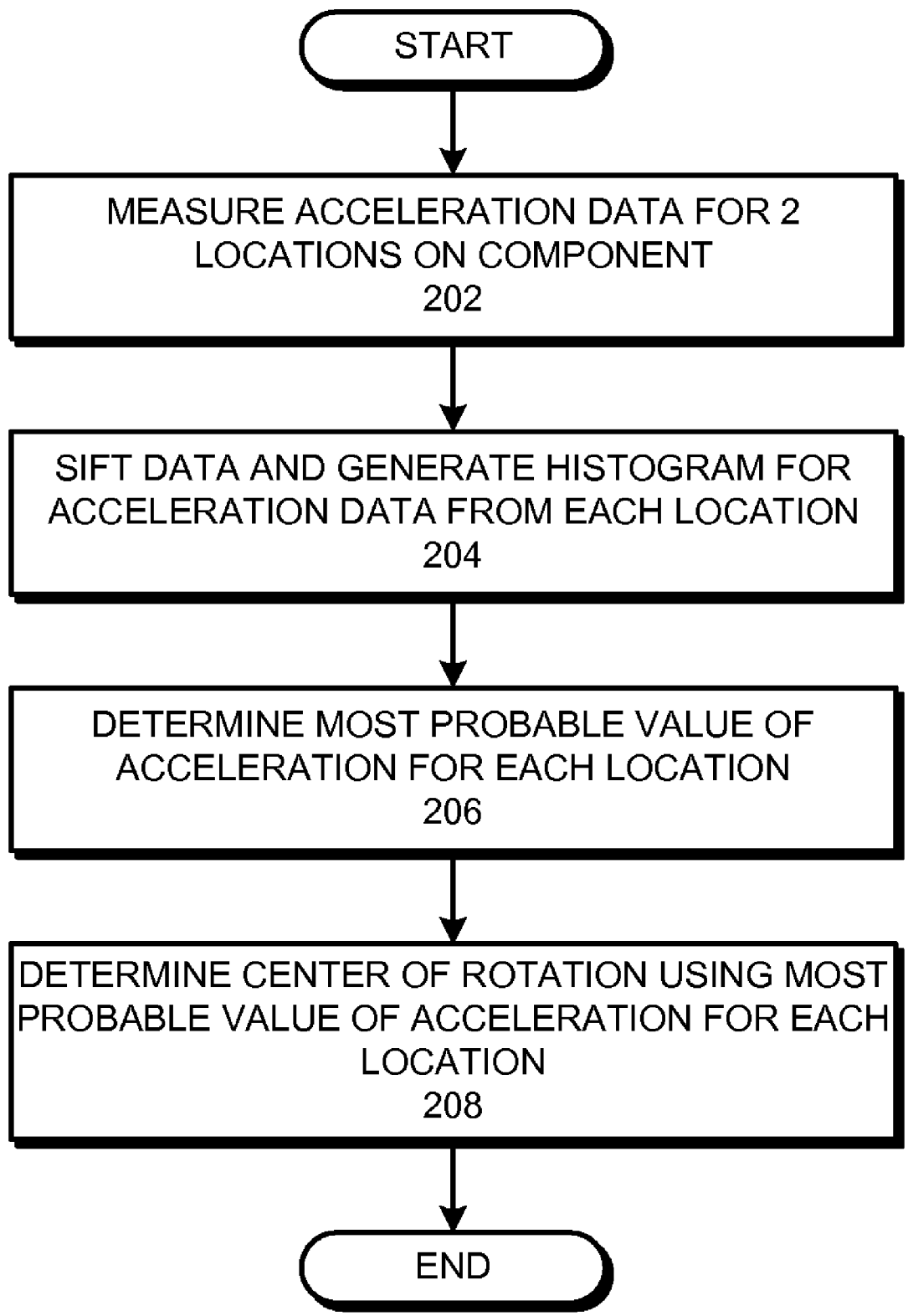
FIG. 2 presents a flowchart illustrating a process for determining a center of rotation for a component in a computer system in accordance with some embodiments of the present invention.

FIG. 2 presents a flowchart illustrating a process for determining a center of rotation for a component in a computer system in accordance with some embodiments of the present invention. First, acceleration data for 2 locations on the component of interest is measured (step 202). Next, the acceleration data from each location is sifted (step 204). In some embodiments the acceleration data for each location is sifted for data that provides a small condition number value, and a histogram is generated from the sifted data for each location (step 204). The histogram is then used to determine the most probable value of the acceleration data for each location (step 206). Then, the center of rotation is determined using the most probable value of acceleration data for each location (step 208). In some embodiments, the center of rotation is determined from the acceleration data using the techniques detailed above with respect to equations 1 and 2.

In some embodiments, steps 204 and 206 can be eliminated. In these embodiments, the acceleration data for each location is used to determine the center of rotation without sifting the data or generating a histogram. In some embodiments, the acceleration data is filtered before it is used to determine the center of rotation.

In some embodiments, the acceleration data for the 2 locations in step 202 is 2-dimensional acceleration data in which the plane of the acceleration data for one location is parallel to the plane of the acceleration data for the other location.

The process of FIG. 2 can be generalized to 3 dimensions. To determine the center of rotation in 3-dimensions, 3-axis acceleration data for each of 4 locations on a component is measured. In these embodiments, the 4 locations on the component are on the vertices of a known tetrahedron in which the spatial relationship between the four locations is known, and such that all four of the locations are not in the same plane and no 3 locations form a straight line. In these embodiments, when the component, and hence the locations rotate about the center of rotation, the displacement of each location is perpendicular to a vector from the location to the center of rotation. Thus, a system of 4 equations can then be generated in which each equation sets the vector dot product of the rotational displacement of a location with the vector from the location to the center of rotation equal to 0. This system of equations can then be differentiated using the known rules of vector differentiation and then solved for the center of rotation using acceleration data and the 4 known locations.

It is noted that any type of acceleration-measuring device can be used in embodiments of the present invention including but not limited to integrated electronics piezoelectric accelerometers, micro-electromechanical (MEMS) accelerometers, mechanical or optical accelerometers, remote sensing devices, or any other device or system that can measure acceleration of a specified location.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A computer-implemented method for determining a center of rotation for a component in a computer system, comprising:
    electronically measuring a first acceleration of a first location on the component, a second acceleration of a second location on the component, a third acceleration of a third location on the component, and a fourth acceleration of a fourth location on the component, wherein the first location, the second location, the third location, and the fourth location are situated at predetermined locations for vertices of a tetrahedron; and
    electronically determining the center of rotation using the first acceleration, the second acceleration, the third acceleration, the fourth acceleration, and the predetermined locations for vertices of the tetrahedron.

2. The computer-implemented method of claim 1, wherein electronically measuring the first acceleration includes:
    electronically generating a histogram of acceleration of the first location; and
    electronically determining a value of the first acceleration based on the histogram.

3. The computer-implemented method of claim 1, wherein electronically determining the center of rotation includes electronically determining a distance between the component and the center of rotation.

4. The computer-implemented method of claim 1, wherein the component includes a hard disk drive.

5. The computer-implemented method of claim 1, wherein the component includes a mezzanine structure.

6. The computer-implemented method of claim 1, wherein electronically determining the center of rotation includes electronically determining if a chassis intrusion of the computer system has occurred.

7. The computer-implemented method of claim 1, wherein electronically determining the center of rotation includes electronically determining a state of degradation of the component in the computer system.

8. A computer-readable storage medium storing instructions that when executed by a computer cause the computer to perform a method for determining a center of rotation for a component in a computer system, the method comprising:
    measuring a first acceleration of a first location on the component, a second acceleration of a second location on the component, a third acceleration of a third location on the component, and a fourth acceleration of a fourth location on the component, wherein the first location, the second location, the third location, and the fourth location are situated at predetermined locations for vertices of a tetrahedron; and
    determining the center of rotation using the first acceleration, the second acceleration, the third acceleration, the fourth acceleration, and the predetermined locations for vertices of the tetrahedron.

9. The computer-readable storage medium of claim 8, wherein measuring the first acceleration includes:
    generating a histogram of acceleration of the first location; and
    determining a value of the first acceleration based on the histogram.

10. The computer-readable storage medium of claim 8, wherein determining the center of rotation includes determining a distance between the component and the center of rotation.

11. The computer-readable storage medium of claim 8, wherein the component includes a hard disk drive.

12. The computer-readable storage medium of claim 8, wherein the component includes a mezzanine structure.

13. The computer-readable storage medium of claim 8, wherein determining the center of rotation includes determining if a chassis intrusion of the computer system has occurred.

14. The computer-readable storage medium of claim 8, wherein determining the center of rotation includes determining a state of degradation of the component in the computer system.

15. An apparatus for determining a center of rotation for a component in a computer system, comprising:
    a measuring mechanism configured to measure a first acceleration of a first location on the component, a second acceleration of a second location on the component, a third acceleration of a third location on the component, and a fourth acceleration of a fourth location on the component, wherein the first location, the second location, the third location, and the fourth location are situated at predetermined locations for vertices of a tetrahedron; and
    a determining mechanism configured to determine the center of rotation using the first acceleration, the second acceleration, the third acceleration, the fourth acceleration, and the predetermined locations for vertices of the tetrahedron.

16. The apparatus of claim 15, wherein the measuring mechanism is configured to:
    generate a histogram of acceleration of the first location; and
    determine a value of the first acceleration based on the histogram.

17. The apparatus of claim 15, wherein the determining mechanism is configured to determine a distance between the component and the center of rotation.

* * * * *